United States Patent
McIntosh et al.

(10) Patent No.: US 7,475,205 B2
(45) Date of Patent: Jan. 6, 2009

(54) SYSTEM FOR INVENTORY CONTROL OF AN AUTOMATED DATA STORAGE LIBRARY

(75) Inventors: Michael P. McIntosh, Tucson, AZ (US); Shawn M. Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 11/291,702

(22) Filed: Dec. 1, 2005

(65) Prior Publication Data
US 2007/0130420 A1 Jun. 7, 2007

(51) Int. Cl.
*G06F 12/00* (2006.01)
(52) U.S. Cl. .................. 711/161; 711/148; 711/170; 711/5; 711/115; 710/17; 710/13
(58) Field of Classification Search ............. None
See application file for complete search history.

(56) References Cited

U.S. PATENT DOCUMENTS 5,867,335 A * 2/1999 Ozue et al. ............... 360/71
2003/0090829 A1 * 5/2003 Johnson et al. ............ 360/69
2005/0040272 A1 * 2/2005 Argumedo et al. ......... 242/348

\* cited by examiner

*Primary Examiner*—B. James Peikari
(74) *Attorney, Agent, or Firm*—Konrad Raynes & Victor LLP

(57) ABSTRACT

An automated data library system employing a plurality of cartridges, one or more cartridge storage slots and an inventory controller. Each cartridge includes a cartridge memory. The cartridge storage slot(s) is(are) physically configured to store the cartridges. The inventory controller is operable to generate an inventory of the cartridges as stored within the cartridge storage slot(s). A generation by the inventory controller of the inventory of the cartridges as stored within the cartridge storage slot(s) involves the inventory controller simultaneously accessing cartridge identification information on two or more cartridge memories, and generating the inventory including two or more cartridges corresponding to the cartridge identification information.

5 Claims, 13 Drawing Sheets

SYSTEM FOR INVENTORY CONTROL OF AN AUTOMATED DATA STORAGE LIBRARY

FIELD OF THE INVENTION

This invention relates to automated data storage libraries, and more particularly, to an automated data storage library employing an inventory method involving a technique for performing a fast inventory of cartridges.

BACKGROUND OF THE INVENTION

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that store data to, and/or retrieve data from, the data storage media. The transport of data storage media between data storage shelves and data storage drives is typically accomplished by one or more robotic accessors (hereinafter termed "accessors"). Such accessors have grippers for physically retrieving the selected data storage media from the storage shelves within the automated data storage library and transport such media to the data storage drives by moving in the horizontal "X" and vertical "Y" directions. As such, it is important that accessors have the capability of being able to accurately locate storage shelves and data storage drives.

Currently, automated data storage libraries use an optical system such as a barcode scanner reading cartridge barcode labels to perform an inventory of the library. An inventory process is necessary for the library when cartridges are loaded or unloaded from the library, a library door is opened, or the library is powered cycled. The current process for the inventory of the library is relatively slow because the robotics inside the library must drive a barcode reader to scan each cartridge label within the desired area to be inventoried. This slow performance of library inventory can affect overall library performance seen by the client, especially in light of clients' desires for bulk loading and unloading of the library. Thus, there is a need for a quicker inventory method of the automated data storage library.

Another problem with the current inventory process is that each cartridge label must be visible to the barcode reader in order to complete the inventory. If cartridges are stacked behind each other in deep slots, the barcode label of the rear cartridge(s) cannot be read by the barcode scanner. An inventory process could be implemented where the front cartridges in a deep slot are removed so that the barcode labels of the rear cartridges could be read by the barcode scanner, but this would be an extremely slow process due to all of the extra cartridge handling involved. Thus, this is a further need for an efficient inventory method involving deep cartridge storage slots.

SUMMARY OF THE INVENTION

The present invention provides a new and unique method of generating an inventory of one or more cartridges of any type stored within one or more cartridge storage slots of an automated data storage library.

One form of the present invention is a signal bearing medium tangibly embodying a program of machine-readable instructions executed by a processor to perform operations for generating an inventory of a plurality of cartridges as stored within one or more cartridge storage slots of an automated data storage library with each cartridge including a cartridge memory. The operations comprise a simultaneous accessing of cartridge identification information on two or more cartridge memories, and a generation of the inventory including two or more cartridges corresponding to the cartridge identification information.

A second form of the present invention is an inventory controller for an automated data storage library storing a plurality of cartridges within at least one cartridge storage slot with each cartridge including a cartridge memory. The inventory controller comprises a processor and memory storing instructions operable within the processor for generating an inventory of the cartridges as stored within the cartridge storage slot(s). The instructions being executed for simultaneously accessing cartridge identification information on two or more cartridge memories, and generating the inventory including two or more cartridges corresponding to the cartridge identification information.

A third form of the present invention is an automated data storage library comprising a plurality of cartridges, one or more cartridge storage slots and an inventory controller. Each cartridge includes a cartridge memory. The cartridge storage slot(s) is (are) physically configured to store the cartridges. The inventory controller is operable to generate an inventory of the cartridges as stored within the cartridge storage slot(s). A generation by the inventory controller of the inventory of the cartridge as stored within the cartridge storage slot(s) involves the inventory controller simultaneously accessing cartridge identification information on two or more cartridge memories, and generating the inventory including two or more cartridges corresponding to the cartridge identification information.

The forgoing forms and other forms as well as objects, features and advantages of the present invention will become further apparent from the following detailed description of the various embodiments of the present invention, read in conjunction with the accompanying drawings. The detailed description and drawings are merely illustrative of the present invention rather than limiting, the scope of the present invention being defined by the appended claims and equivalents thereof.

DETAILED DESCRIPTION OF THE INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
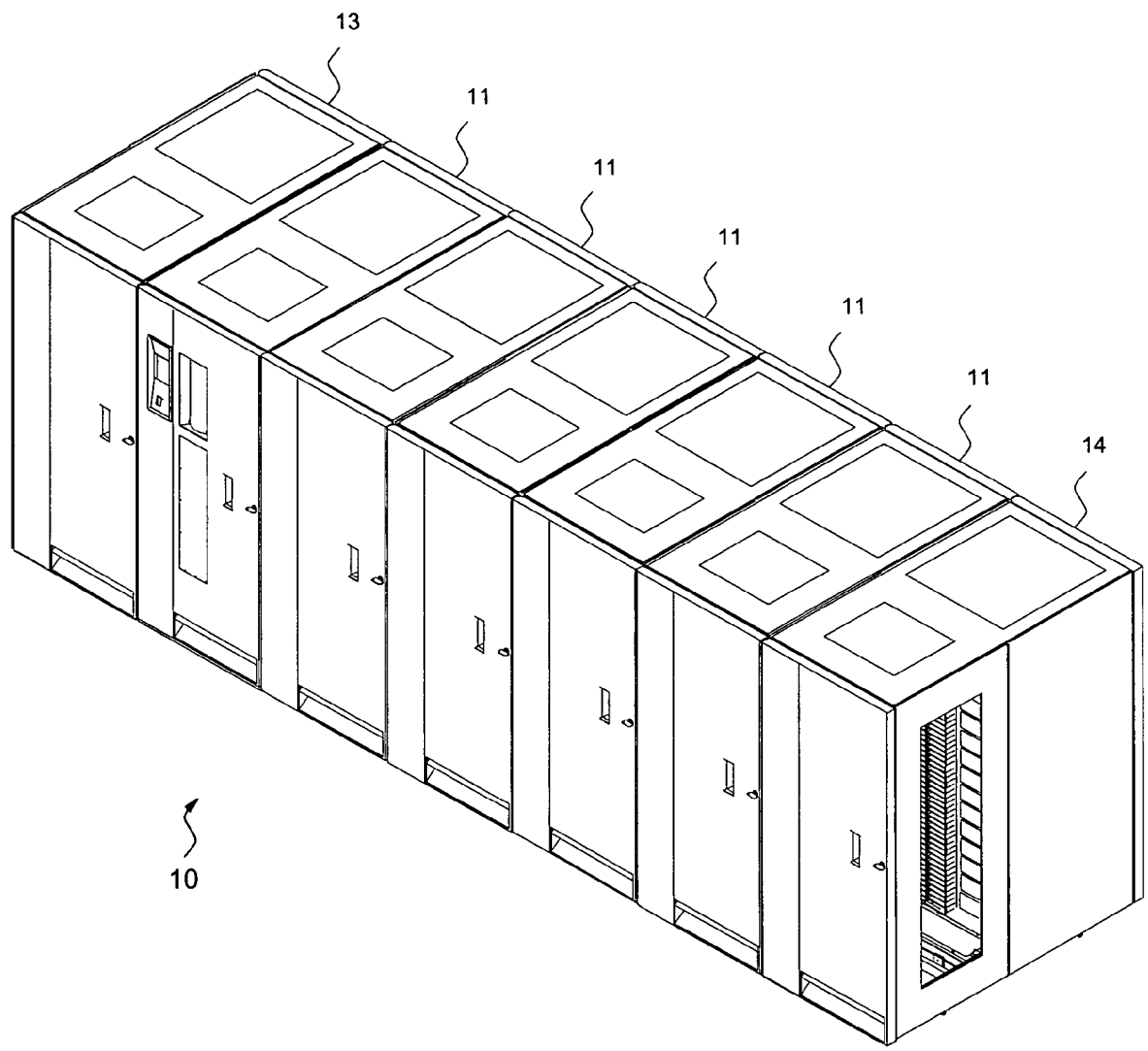
FIG. 1 illustrates an isometric view of an automated data storage library adaptable to implement an embodiment of the present invention, with the view specifically depicting a library having a left hand service bay, multiple storage frames and a right hand service bay.
Figure 2:
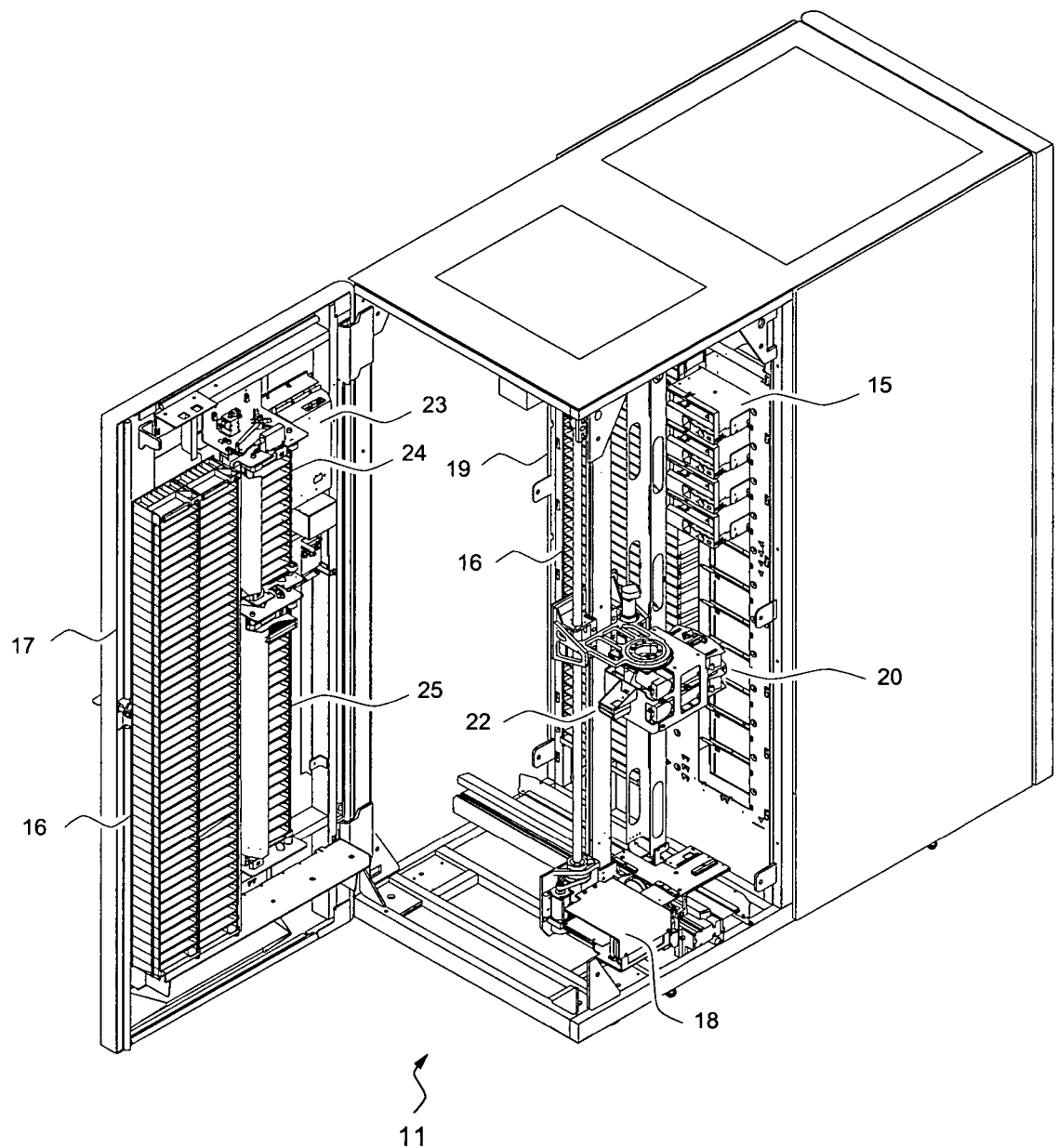
FIG. 2 illustrates an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage shelves 16, one front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper assembly 20, to "read" identifying information about the data storage media.

Figure 3:
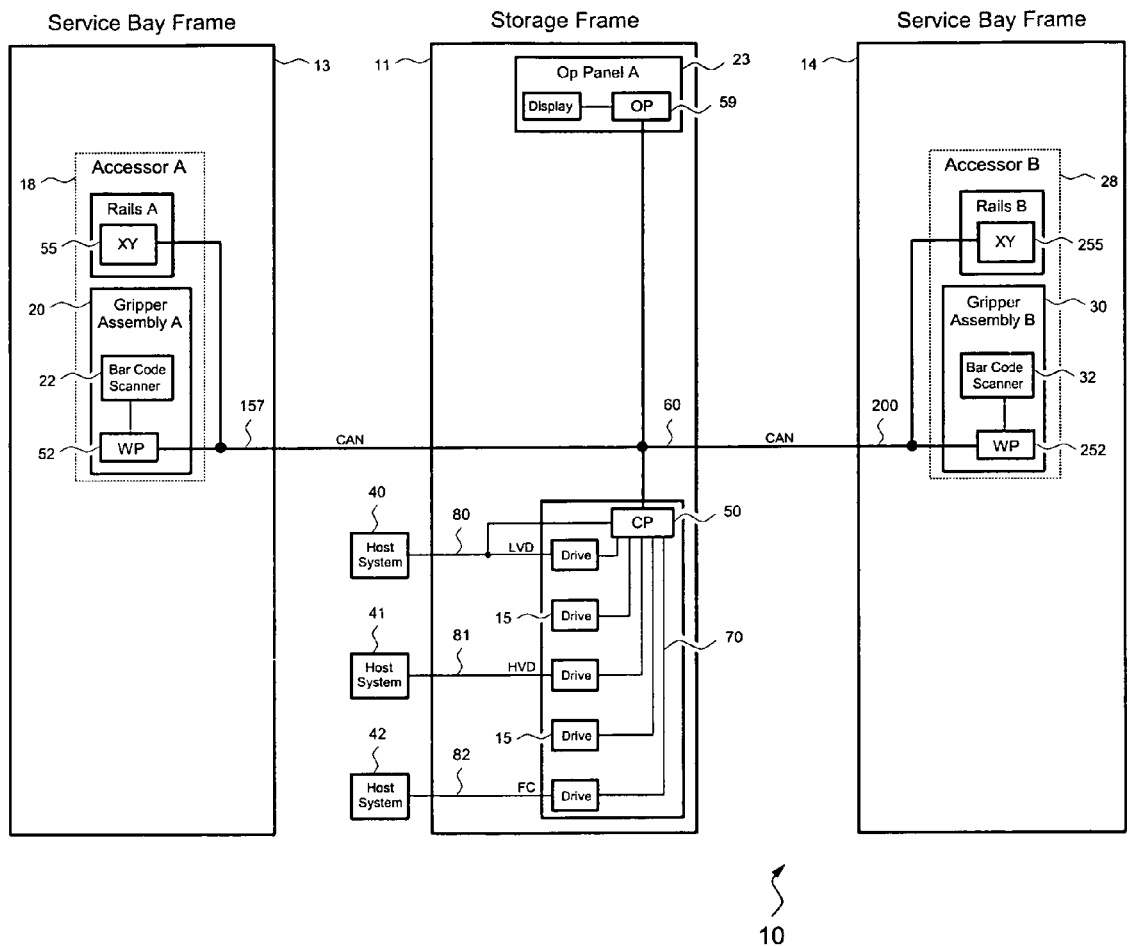
FIG. 3 illustrates a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which may implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein for reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper assembly 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
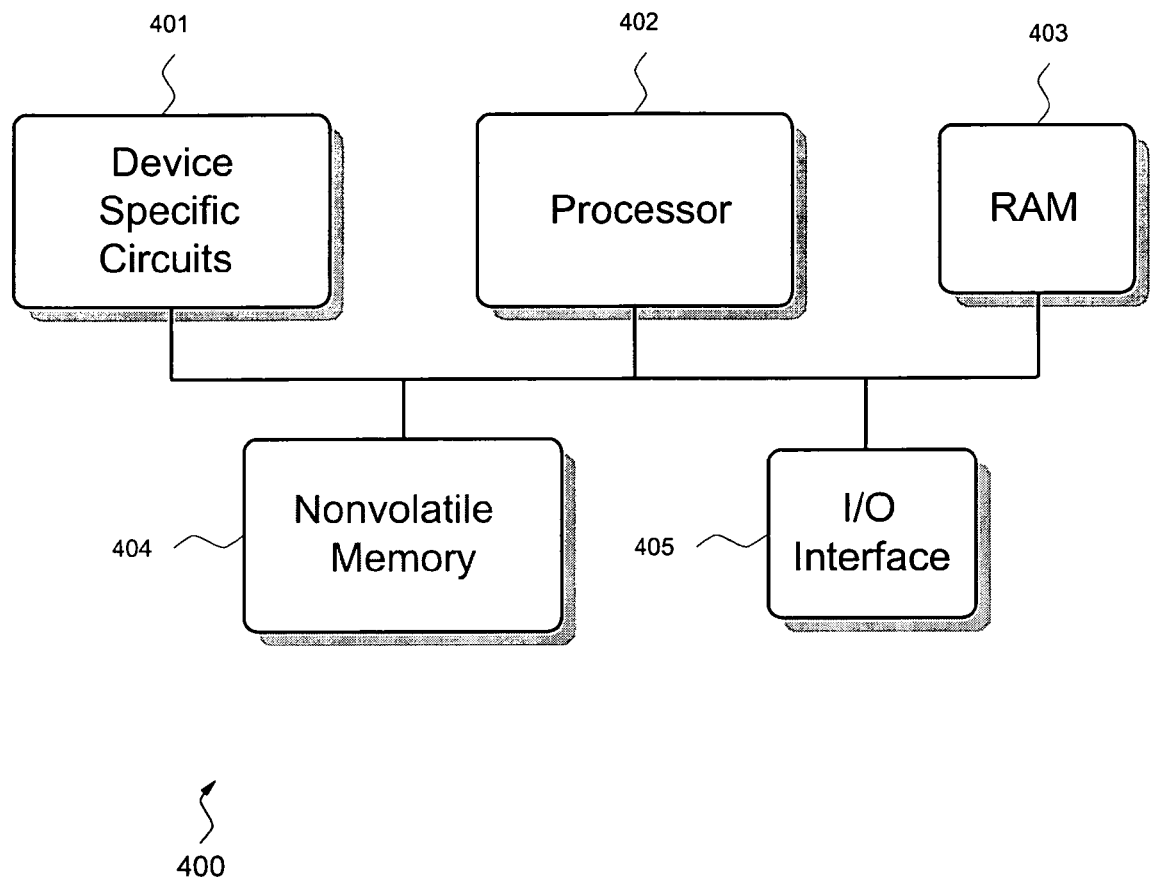
FIG. 4 illustrates a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation, etc. In another example, one of the processor nodes 50, 52, 55, 59, 252, 255 may comprise a controller. Still further, two or more of the processor nodes may comprise a controller. In this example, the controller may be distributed among the two or more processor nodes. Essentially, the term "controller" as used herein is intended in its broadest sense as a device or system that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like.

The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus), Fibre Channel, SCSI (Small Computer Systems Interface), etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

Figure 5:
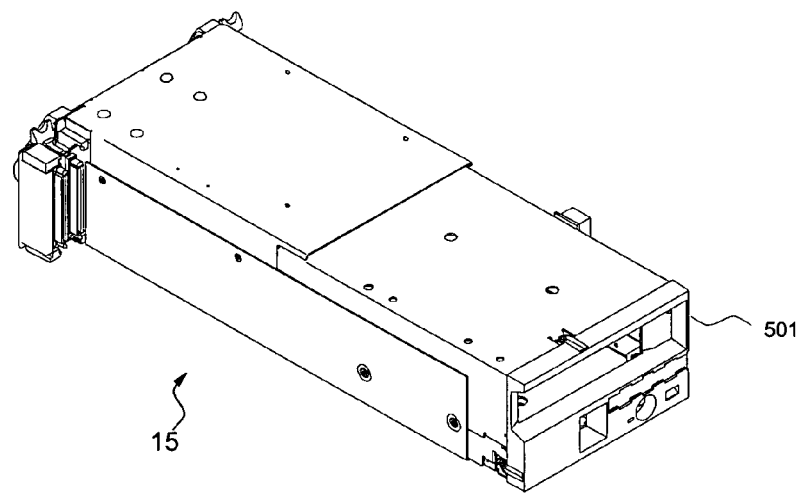
FIG. 5 illustrates an isometric view of the front and rear of a data storage drive adaptable to implement an embodiment of the present invention.
Figure 5:
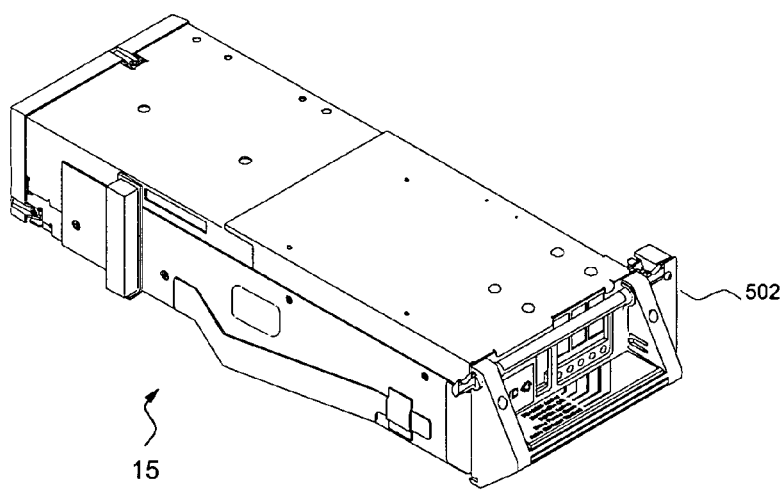

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
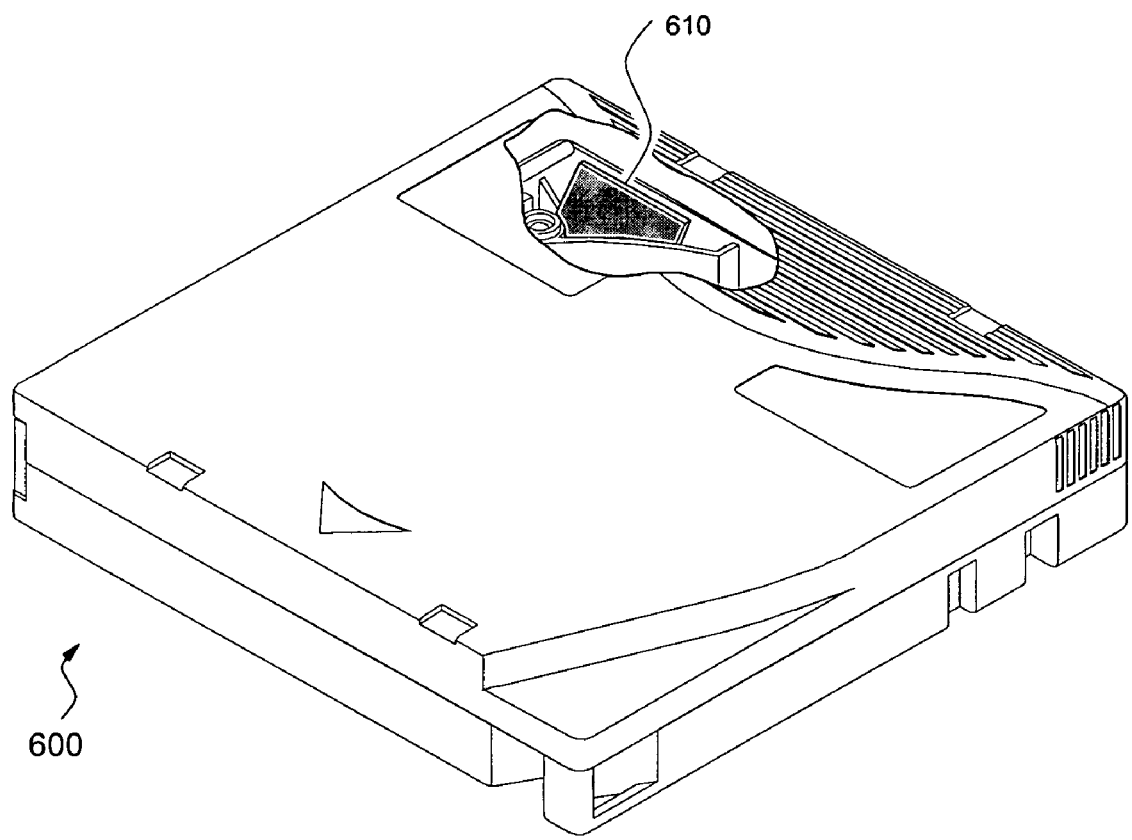
FIG. 6 illustrates an isometric view of a data storage cartridge adaptable to implement an embodiment of the present invention.

FIG. 6 illustrates an embodiment of a data storage cartridge 600 (e.g., a LTO cartridge or a 3592 cartridge) with a cartridge memory 610 shown in a cutaway portion of the Figure. This is only an example and is not meant to limit the invention to the cartridge memories as shown.

In one embodiment, cartridge memories 610 includes radio frequency identification ("RFID") tags. To generate a cartridge inventory of an automated data storage library, an inventory system of the present invention is provided to simultaneously access cartridge identification information on the RFID tags of each cartridge memory 610 subject to the inventory for purposes of reading and/or writing the cartridge identification information. In the context of the present invention, a simultaneous accessing of cartridge identification information is not limited to each accessing of cartridge identification information beginning exactly at the same time and ending exactly at the same time. Furthermore, a simultaneous accessing of cartridge identification information is not limited to a simultaneous accessing of all cartridge identification information as a single group. Thus, as would be appreciated by those having ordinary skill in the art, a simultaneous accessing of cartridge identification information encompasses at least some degree of overlap in cartridge identification information of a specified group of cartridge memories 610 that may or may not include all of the cartridge memories 610.

The inventory system of the present invention is applicable to any type of single cartridge storage slot configuration, any type of configuration of a single column array of cartridge storage slots, and any type of configuration of a multiple column array of cartridge storage slots. Thus, to facilitate an understanding of the inventory system of the present invention, exemplary embodiments of an inventory systems of a single cartridge storage slot, a single column array of cartridge storage slots and a multiple column array of cartridge storage slots will now be described herein in connections with FIGS. 7-9, respectively. From these descriptions, those having ordinary skill in the art will appreciate how to apply the inventive principles to other embodiments of an inventory system of the present invention.

Figure 7:
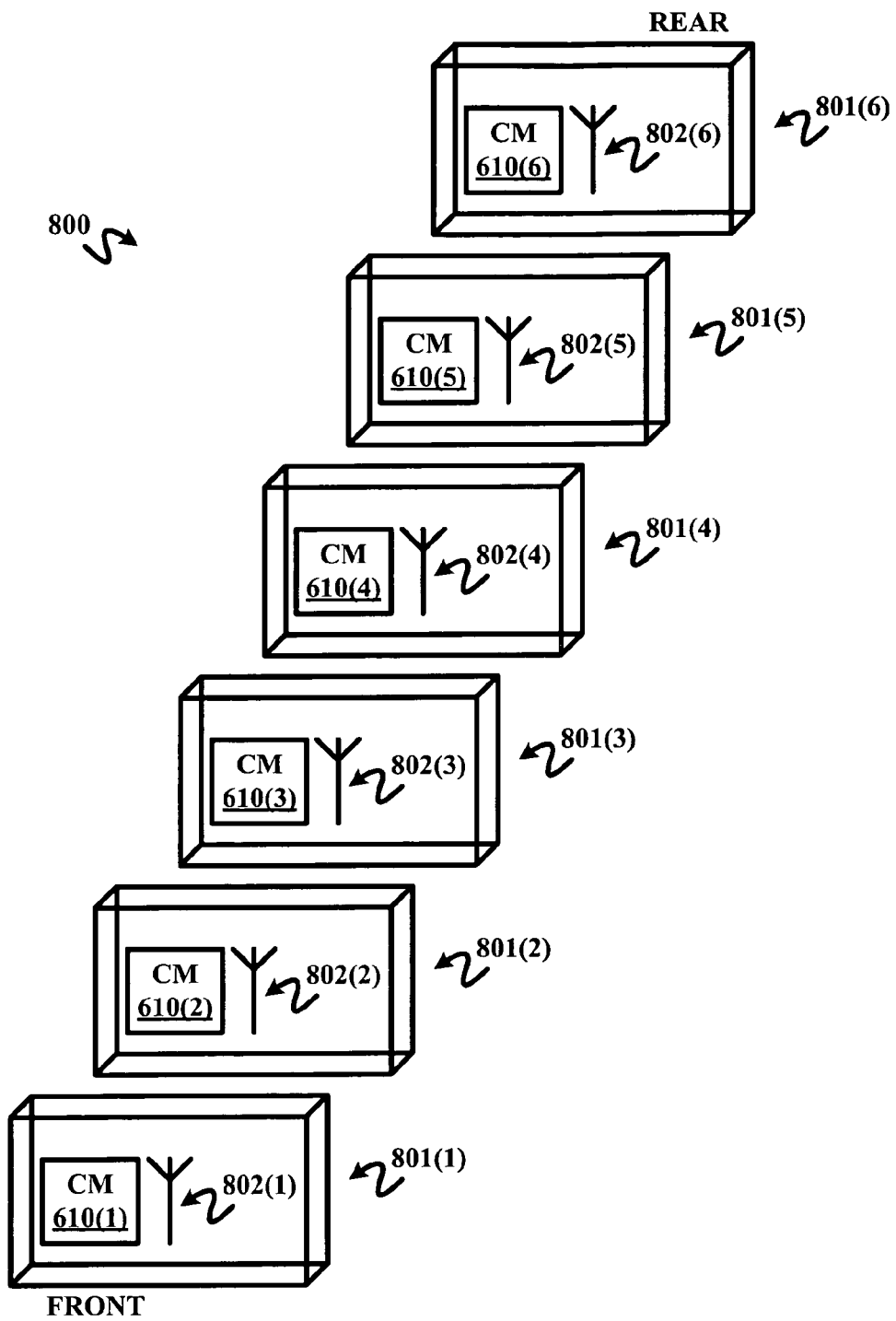
FIG. 7 illustrates a block diagram of an exemplary embodiment of a single deep cartridge storage slot inventory system in accordance with the present invention.

FIG. 7 illustrates a block diagram of a fragmented perspective view of a single cartridge storage slot configuration 800 having six (6) cartridge storage cells 801(1)-801(6). Each cartridge storage cell 801 is physically configured to store a cartridge therein (not shown). Each cartridge storage cell 801 is associated with an antenna 802, internally as shown or externally, to communicate with a cartridge memory 610 of a cartridge stored therein. An inventory controller 700 is structurally configured in accordance with the description of FIG. 4 herein to generate an inventory of each cartridge stored among the cartridge storage cells 801.

Figure 8:
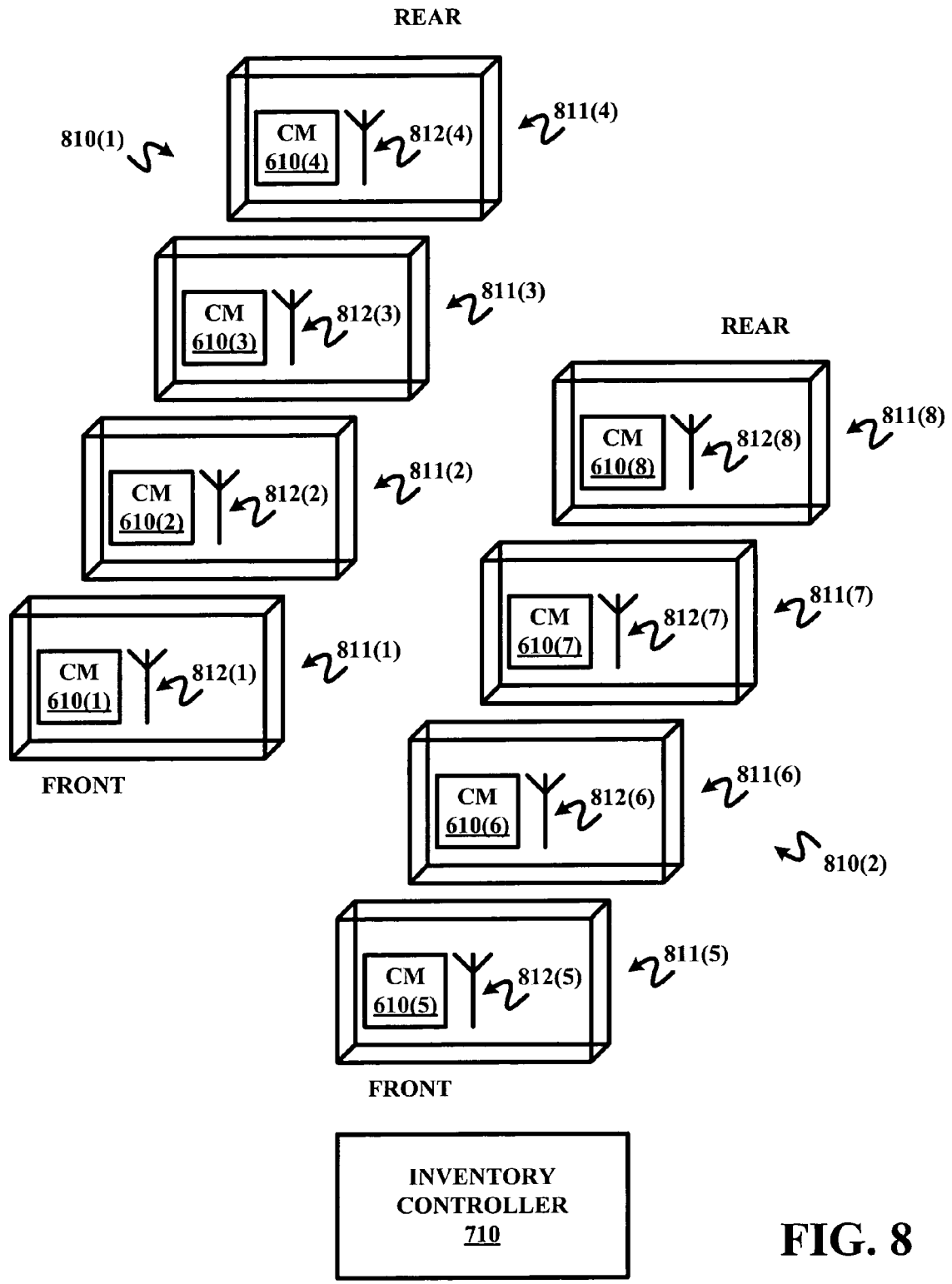
FIG. 8 illustrates a block diagram of an exemplary embodiment of a single column array of deep cartridge storage slots inventory system in accordance with the present invention.

FIG. 8 illustrates a block diagram of a fragmented perspective view of a configuration of a single column array of cartridge storage slots with a top cartridge storage slot 810(1) having four (4) cartridge storage cells 811(1)-811(4) and a bottom cartridge storage slot 810(2) having four (4) cartridge storage cells 811(5)-811(8). Each cartridge storage cell 811 is physically configured to store a cartridge therein (not shown). Each cartridge storage cell 811 is associated with an antenna 812, internally as shown or externally, to communicate with a cartridge memory 610 of a cartridge stored therein. An inventory controller 710 is structurally configured in accordance with the description of FIG. 4 herein to generate an inventory of each cartridge stored among the cartridge storage cells 811.

Figure 9:
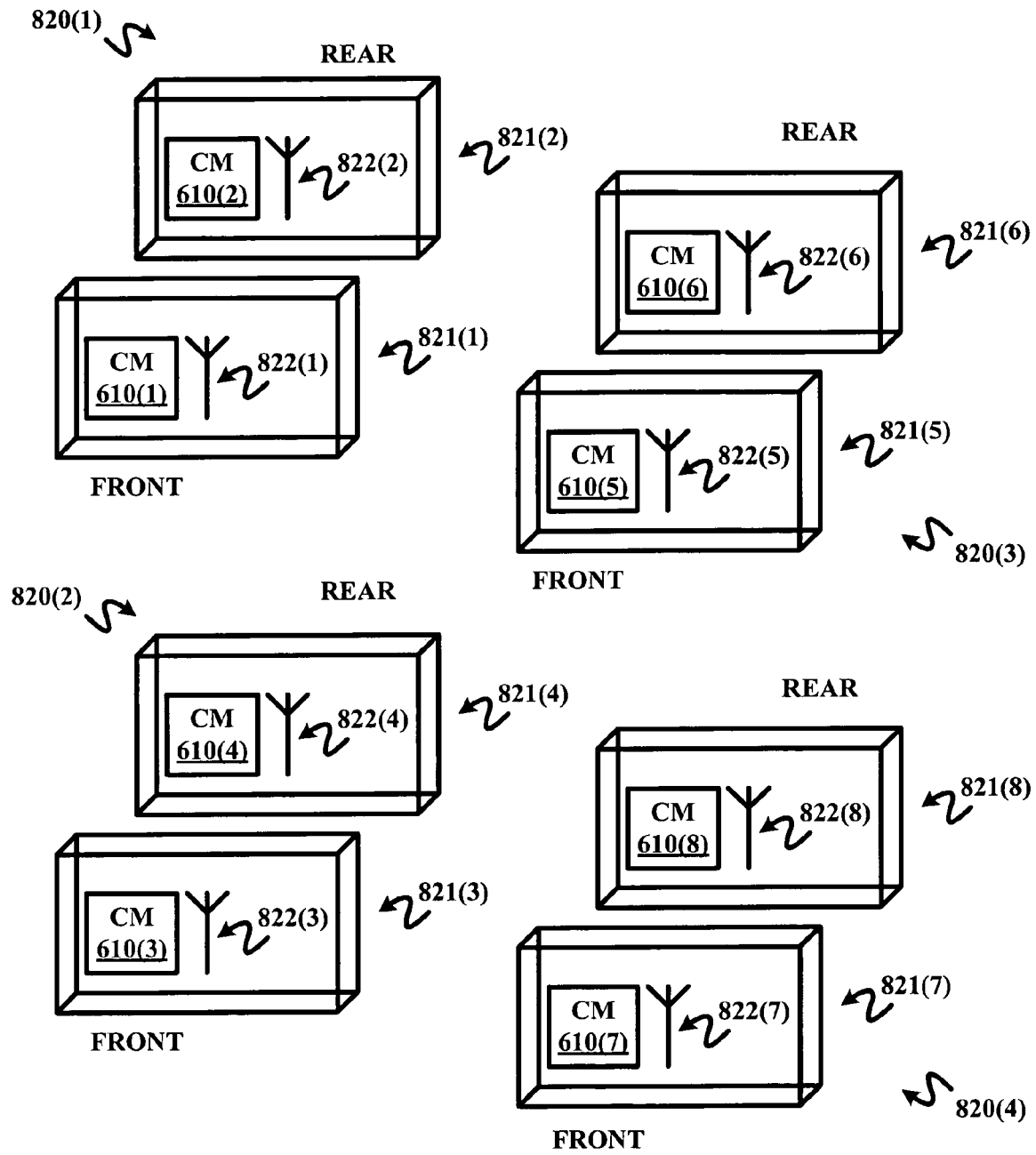
FIG. 9 illustrates a block diagram of an exemplary embodiment of a multiple column array of deep cartridge storage slots inventory system in accordance with the present invention.

FIG. 9 illustrates a block diagram of a fragmented perspective view of a configuration of a multiple column array of cartridge storage slots of four (4) cartridge storage slots. A top left column cartridge storage slot 820(1) of the multiple column array has two (2) cartridge storage cells 821(1) and 821(2). A bottom left column cartridge storage slot 820(2) of the multiple column array has two (2) cartridge storage cells 821(3) and 821(4). A top right column cartridge storage slot 820(3) of the multiple column array has two (2) cartridge storage cells 821(5) and 821(6), A bottom right column cartridge storage slot 820(4) of the multiple column array has two (2) cartridge storage cells 821(7) and 821(8).

Each cartridge storage cell 821 is physically configured to store a cartridge therein (not shown). Each cartridge storage cell 821 is associated with an antenna 822, internally as shown or externally, to communicate with a cartridge memory 610 of a cartridge stored therein. An inventory controller 720 is structurally configured in accordance with the description of FIG. 4 herein to generate an inventory of each cartridge stored among the cartridge storage cells 821.

Figure 10:
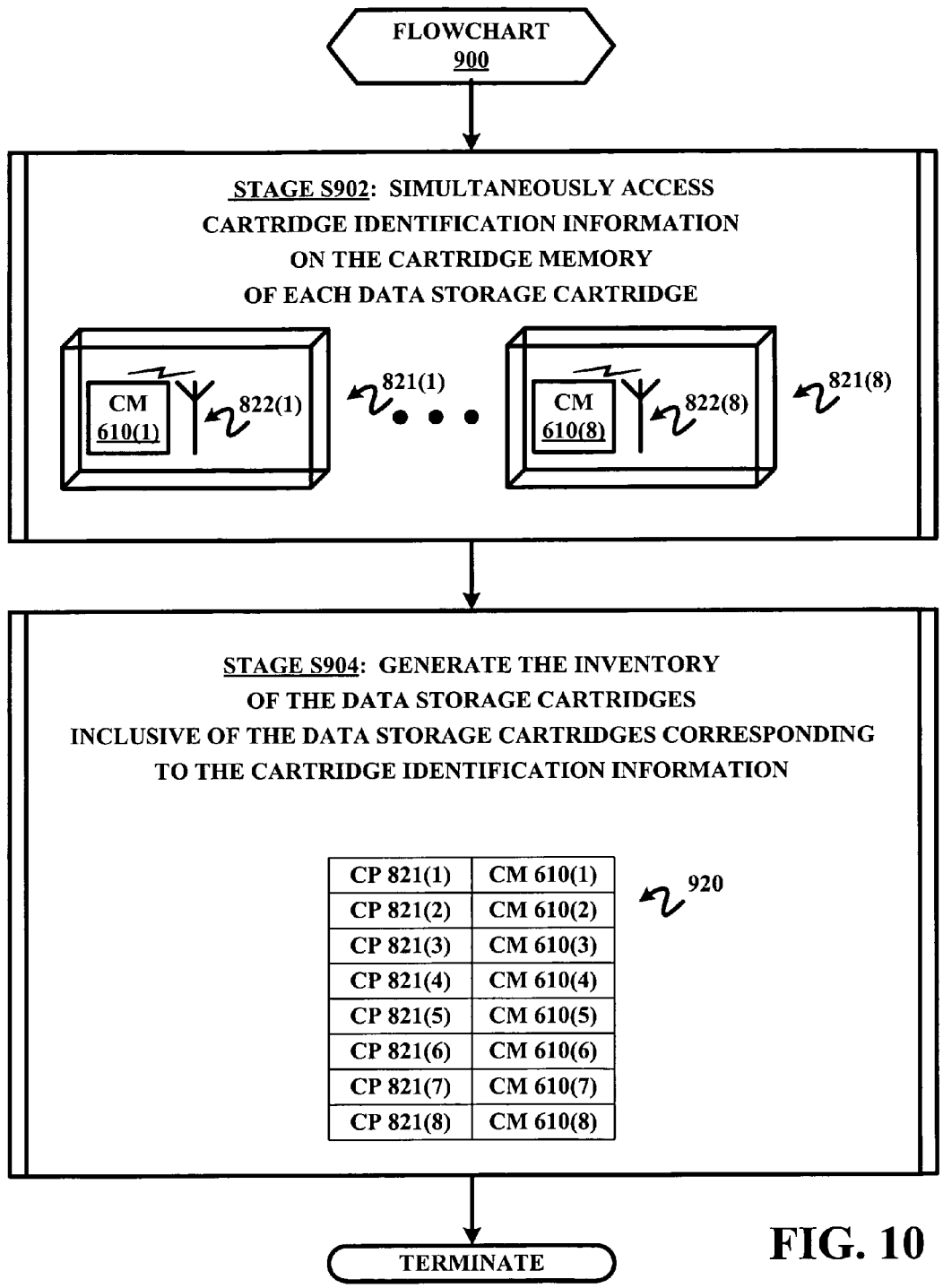
FIG. 10 illustrates a flowchart representative of a library inventory method in accordance with the present invention.

Inventory controllers 700 (FIG. 7), 710 (FIG. 8) and 720 (FIG. 9) include software and/or firmware to implement an inventory method of the present invention. FIG. 10 illustrates a flowchart 900 representative of the inventory method of the present invention.

A stage S902 of flowchart 900 encompasses an inventory controller simultaneously accessing (i.e., reading and/or writing) cartridge identification information on the cartridge memory of each cartridge based on simultaneous radio frequency communications between cartridge memories of the data storage cartridges stored in the cartridge storage slots and antennas associated with the cartridge storage slots. For example, referring to FIGS. 9 and 10, inventory controller 720 would simultaneously establish multiple radio frequency communications between cartridge memories 610 of cartridges stored within respective cartridge storage cells 821 and the antennas 822 associated with the respective cartridge storage cells 821 to thereby access cartridge identification information on cartridge memories 610.

By further example, still referring to FIGS. 9 and 10, inventory controller 720 would simultaneously establish multiple radio frequency communication between cartridge memories 610(1)-610(4) of cartridges stored within respective cartridge storage cells 821(1)-821(4) and the antennas 822(1)-822(4) associated with the respective cartridge storage cells 821(1)-821(4) to thereby access cartridge identification information on cartridge memories 610(1)-610(4). Immediately thereafter, inventory controller 720 would simultaneously establish multiple radio frequency communication between cartridge memories 610(5)-610(8) of cartridges stored in respective cartridge storage cells 821(5)-821(8) and the antennas 822(5)-822(8) associated with the respective cartridge storage cells 821(5)-821(8) to thereby access cartridge identification information on cartridge memories 610(5)-610(8).

Also by further example, still referring to FIGS. 9 and 10, inventory controller 720 would simultaneously establish multiple radio frequency communications between cartridge memories 610(1) and 610(2) of cartridges stored in respective cartridge storage cells 821(1) and 821(2) and the antennas 822(1) and 822(2) associated with the respective cartridge storage cells 821(1) and 821(2) to thereby access cartridge identification information on cartridge memories 610(1) and 610(2).

Immediately thereafter, inventory controller 720 would simultaneously establish multiple radio frequency communications between cartridge memories 610(3) and 610(4) of cartridges stored in respective cartridge storage cells 821(3) and 821(4) and the antennas 822(3) and 822(4) associated with the respective cartridge storage cells 821(3) and 821(4) to thereby access each cartridge identification information on cartridge memories 610(3) and 610(4).

Immediately thereafter, inventory controller 720 would simultaneously establish a radio frequency communication between each cartridge memory 610(5) and 610(6) of cartridges stored in cartridge storage cells 821(5) and 821(6) and the antennas 822(5) and 822(6) associated with the cartridge storage cells 821(5) and 821(6) to thereby access cartridge identification information on cartridge memories 610(5) and 610(6). Immediately thereafter, inventory controller 720 would simultaneously establish a radio frequency communication between each cartridge memory 610(7) and 610(8) of cartridges stored in cartridge storage cells 821(7) and 821(8) and the antennas 822(7) and 822(8) associated with the cartridge storage cells 821(7) and 821(8) to thereby access each cartridge identification information on cartridge memories 610(7) and 610(8).

A stage S904 of flowchart 900 encompasses the inventory controller generating the inventory inclusive of the cartridges corresponding to the read cartridge information identification. For example, as shown in FIGS. 9 and 10, inventory controller 70 would generate an inventory 920 including a listing of each cartridge (represented by its cartridge memory 610) as stored in one of the cartridge storage cells 821 of cartridge storage slots 820.

To properly associate an antenna with a cartridge storage cell of a cartridge storage slot for inventory purposes of the present invention, one embodiment of the inventory system uses an imbedded flex cable to extend a series of antennas that can read and/or write to the cartridge memories of the cartridges into the cartridge storage slots. A single flex cable could contain multiple antennas to read and/or write to the cartridge memories of multiple cartridges simultaneously. Furthermore, since the flex cable is imbedded in the storage cells there is no robotic motion or scanning required to inventory the library. Also, the flex cable could be positioned such that it could read and/or write to the cartridge memories of the cartridges that are located behind other cartridges in deep cartridge storage slots.

Figure 11:
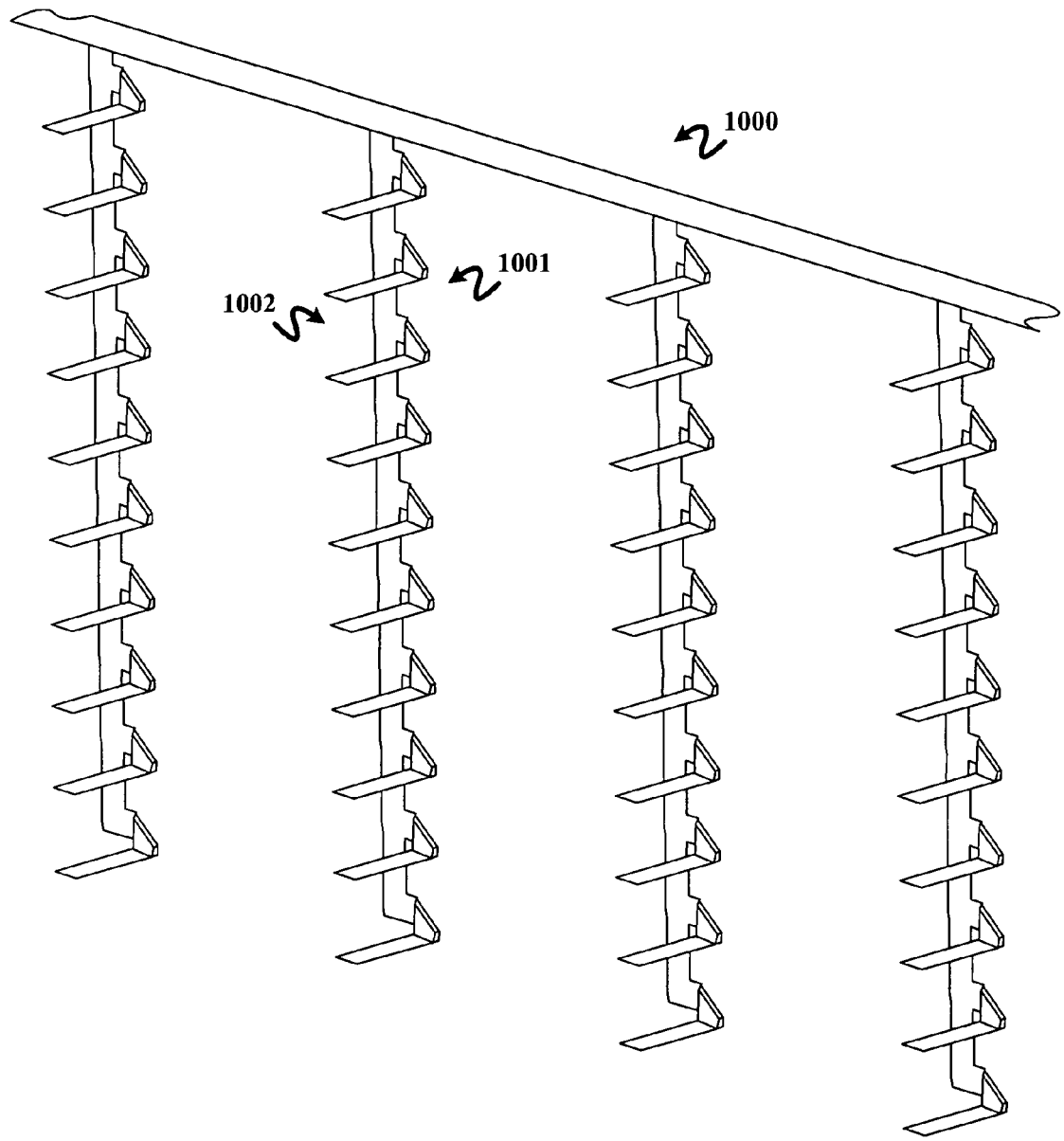
FIG. 11 illustrates an isometric partial view of a flex cable in accordance with the present invention.

FIG. 11 illustrates an exemplary single flex cable 1000 with multiple branches 1001 with each branch 1001 having an antenna 1002 for reading a cartridge memory of any cartridge stored within an associated cartridge storage cell. In one embodiment, flex cable 1000 has two copper layers. A top layer includes antennas 1002 and cartridge memory reading circuitry (not shown), and a bottom layer includes shielding to thereby prevent a reading by an antenna 1002 of a cartridge memory of a cartridge not stored in its associated cartridge storage cell.

Figure 12:
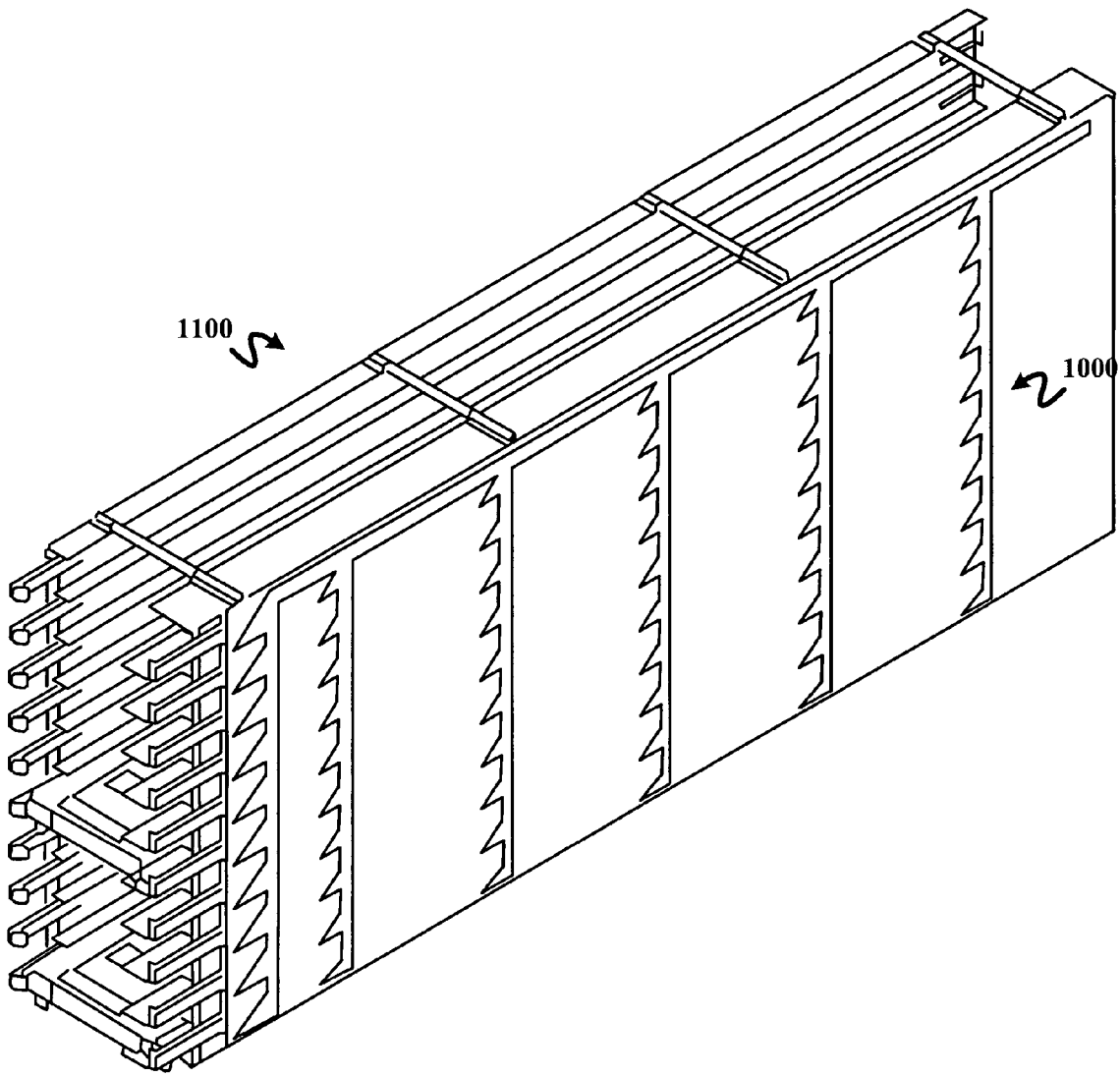
FIG. 12 illustrates an isometric view of one embodiment of the flex cable illustrated in FIG. 11 imbedded into a single column array of deep cartridge storage slots in accordance with the present invention.
Figure 13:
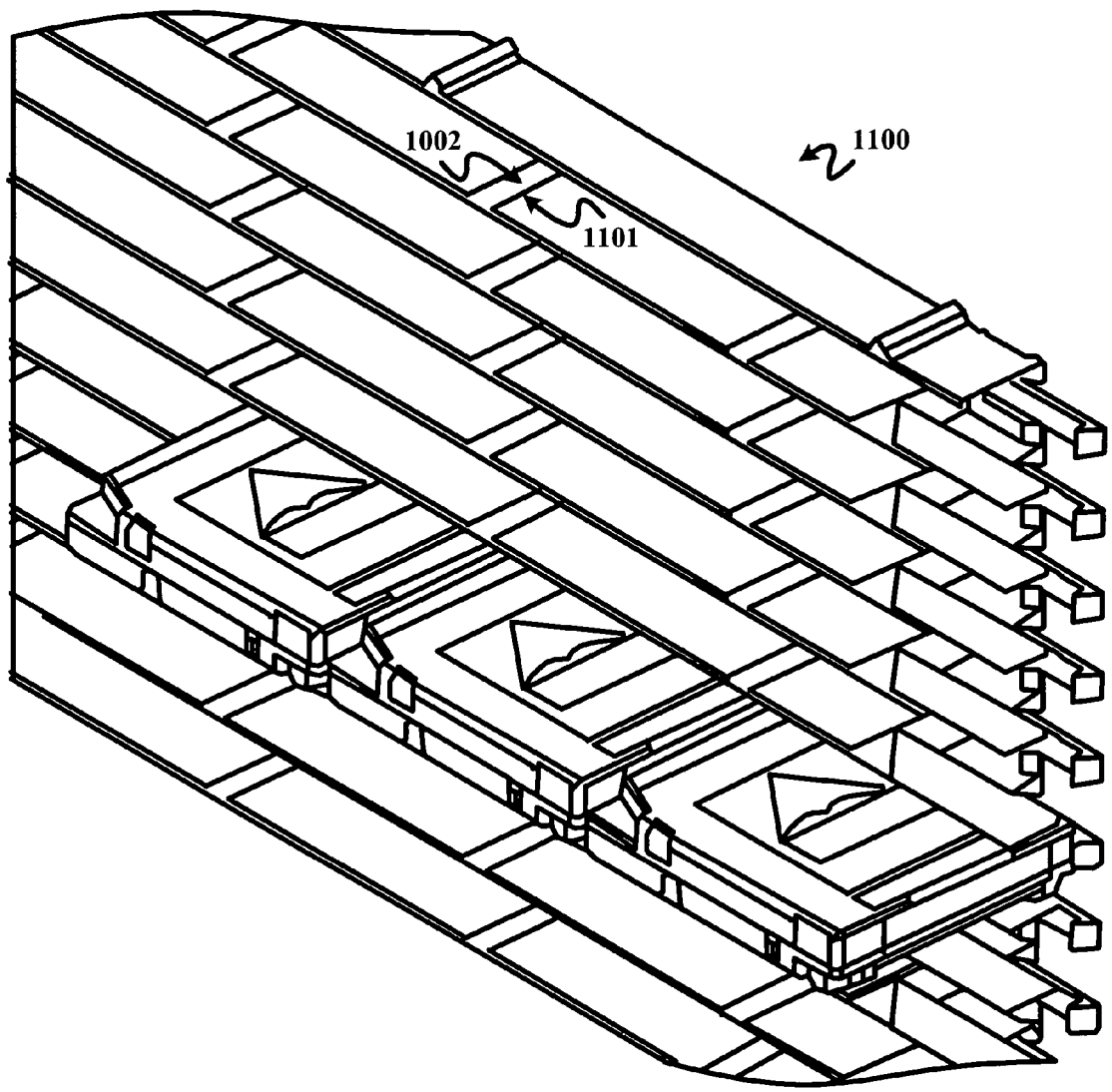
FIG. 13 illustrates an isometric partial view of a portion of the cartridge storage slots illustrated in FIG. 12.

The folds in flex cable 1000 as shown enables each antenna 1002 to be fittingly extended into its associated cartridge storage cell as exemplary illustrated in FIGS. 12 and 13. Specifically, flex cable 1000 is disposed on an external surface of a side wall of a single column array 1100 of cartridge slots as shown in FIG. 12 to thereby extend each antenna 1002 into a floor recess 1101 of each cartridge storage cell of array 1100 as shown in FIG. 13. Each antenna 1002 can be held in place with a pressure sensitive adhesive (not shown) on flex cable 1000 to prevent flex cable 1000 from getting caught or rubbed during an insertion or removal of a cartridge from array 1100. As shown in FIG. 13, an antenna 1002 underneath a stored cartridge is used to read and/or write to a cartridge memory of the stored data cartridge.

The other end of flex cable 100 that is not shown can could be plugged into one of the control cards of the library, preferably a control card that is not associated with the robotics of the library.

Referring to FIGS. 7-13, those having ordinary skill in the art will appreciate the numerous advantages of the inventory system of the present invention, including, but not limited to, a capability of conducting an immediate inventory of every cartridge stored within a library without the use of a barcode reader and without having to move the stored cartridges.

While the preferred embodiments of the present invention have been illustrated in detail, the skilled artisan will appreciate that modifications and adaptations to those embodiments may be made without departing from the scope of the present invention as set forth in the following claims.

What is claimed is:

1. An automated data library system, comprising:
a plurality of cartridges, each cartridge including a cartridge memory;
at least one cartridge storage slot physically configured to store the plurality of cartridges; and
an inventory controller operable to generate an inventory of the plurality of cartridges as stored within the at least one cartridge storage slot, wherein a generation of the inventory of the plurality of cartridges as stored within the at least one cartridge storage slot includes:
the inventory controller simultaneously accessing cartridge identification information on at least two cartridge memories wherein the simultaneous accessing of the cartridge identification information on the at least two cartridge memories includes:
establishing a first radio frequency communication between a first cartridge memory of a first cartridge and a first antenna associated with a first cartridge storage cell storing the first cartridge; and
establishing a second radio frequency communication between a second cartridge memory of a second cartridge and a second antenna associated with a second cartridge storage cell storing the second cartridge; and
the inventory controller generating the inventory including at least two cartridges of the plurality of cartridges corresponding to the cartridge identification information wherein the first cartridge storage cell and the second cartridge storage cell are physically situated in a single cartridge storage slot and, further comprising:
a flexible cable including the first antenna and the second antennas,
wherein the flexible cable extends the first antenna and the second antenna into the single cartridge storage slot.

2. An automated data library system, comprising:
a plurality of cartridges, each cartridge including a cartridge memory;
at least one cartridge storage slot physically configured to store the plurality of cartridges; and
an inventory controller operable to generate an inventory of the plurality of cartridges as stored within the at least one cartridge storage slot, wherein a generation of the inventory of the plurality of cartridges as stored within the at least one cartridge storage slot includes:
the inventory controller simultaneously accessing cartridge identification information on at least two cartridge memories; and
the inventory controller generating the inventory including at least two cartridges of the plurality of cartridges corresponding to the cartridge identification information wherein the first cartridge storage cell and the second cartridge storage cell are physically situated in a single column array of cartridge storage slots wherein the simultaneous accessing of the cartridge identification information on the at least two cartridge memories includes:
establishing a first radio frequency communication between a first cartridge memory of a first cartridge and a first antenna associated with a first cartridge storage cell storing the first cartridge; and
establishing a second radio frequency communication between a second cartridge memory of a second cartridge and a second antenna associated with a second cartridge storage cell storing the second cartridge, further comprising:
a flexible cable including the first antenna and the second antennas,
wherein the flexible cable extends the first antenna into a first cartridge storage slot of the single column array of cartridge storage slots, and
wherein the flexible cable extends the second antenna into the first cartridge storage slot.

3. The automated data storage library of claim 2, further comprising:
a flexible cable including the first antenna and the second antennas,
wherein the flexible cable extends the first antenna into a first cartridge storage slot of the single column array of cartridge storage slots, and
wherein the flexible cable extends the second antenna into a second cartridge storage slot of the single column array of cartridge storage slots.

4. An automated data library system, comprising:
a plurality of cartridges, each cartridge including a cartridge memory;
at least one cartridge storage slot physically configured to store the plurality of cartridges; and
an inventory controller operable to generate an inventory of the plurality of cartridges as stored within the at least one cartridge storage slot, wherein a generation of the inventory of the plurality of cartridges as stored within the at least one cartridge storage slot includes:
the inventory controller simultaneously accessing cartridge identification information on at least two cartridge memories; and
the inventory controller generating the inventory including at least two cartridges of the plurality of cartridges corresponding to the cartridge identification information wherein the simultaneous accessing of the cartridge identification information on the at least two cartridge memories includes:
establishing a first radio frequency communication between a first cartridge memory of a first cartridge and a first antenna associated with a first cartridge storage cell storing the first cartridge; and
establishing a second radio frequency communication between a second cartridge memory of a second cartridge and a second antenna associated with a second cartridge storage cell storing the second cartridge further comprising:
a flexible cable including the first antenna and the second antennas,
wherein the flexible cable extends the first antenna into a first cartridge storage slot of the multiple column array of cartridge storage slots, and
wherein the flexible cable extends the second antenna into the first cartridge storage slot.

5. An automated data library system, comprising:
a plurality of cartridges, each cartridge including a cartridge memory;
at least one cartridge storage slot physically configured to store the plurality of cartridges; and
an inventory controller operable to generate an inventory of the plurality of cartridges as stored within the at least one cartridge storage slot, wherein a generation of the inventory of the plurality of cartridges as stored within the at least one cartridge storage slot includes:
the inventory controller simultaneously accessing cartridge identification information on at least two cartridge memories; and the inventory controller generating the inventory including at least two cartridges of the plurality of cartridges corresponding to the cartridge identification information wherein the simultaneous accessing of the cartridge identification information on the at least two cartridge memories includes:

establishing a first radio frequency communication between a first cartridge memory of a first cartridge and a first antenna associated with a first cartridge storage cell storing the first cartridge; and establishing a second radio frequency communication between a second cartridge memory of a second cartridge and a second antenna associated with a second cartridge storage cell storing the second cartridge, further comprising:

a flexible cable including the first antenna and the second antennas,
  wherein the flexible cable extends the first antenna into a first cartridge storage slot of the multiple column array of cartridge storage slots, and
  wherein the flexible cable extends the second antenna into a second cartridge storage slot of the multiple column array of cartridge storage slots.

* * * * *